US012092365B2

(12) United States Patent
Fabrizio

(10) Patent No.: US 12,092,365 B2
(45) Date of Patent: Sep. 17, 2024

(54) DUAL ELEMENT ELECTRIC TANKLESS WATER HEATER

(71) Applicant: Chronomite Laboratories, Inc., City Of Industry, CA (US)

(72) Inventor: Edward Vincent Fabrizio, Rancho Cucamonga, CA (US)

(73) Assignee: Chronomite Laboratories, Inc., City of Industry, CA (US)

( * ) Notice: Subject to any disclaimer, the term of this patent is extended or adjusted under 35 U.S.C. 154(b) by 490 days.

(21) Appl. No.: 16/362,273

(22) Filed: Mar. 22, 2019

(65) Prior Publication Data

US 2019/0219301 A1 Jul. 18, 2019

Related U.S. Application Data

(62) Division of application No. 15/377,185, filed on Dec. 13, 2016, now Pat. No. 10,670,300.

(51) Int. Cl.

| | |
|---|---|
| ***F24H 1/10*** | (2022.01) |
| ***F24H 9/20*** | (2022.01) |
| ***F24H 15/219*** | (2022.01) |
| ***F24H 15/238*** | (2022.01) |
| ***F24H 15/37*** | (2022.01) |
| ***F24H 15/407*** | (2022.01) |
| ***H05B 1/00*** | (2006.01) |
| ***H05B 1/02*** | (2006.01) |

(Continued)

(52) U.S. Cl.

CPC ............. *F24H 1/102* (2013.01); *F24H 1/103* (2013.01); *F24H 9/2028* (2013.01); *F24H 15/219* (2022.01); *F24H 15/238* (2022.01); *F24H 15/37* (2022.01); *H05B 1/00* (2013.01); *H05B 1/0283* (2013.01); *H05B 3/00* (2013.01); *H05B 3/42* (2013.01); *H05B 3/82* (2013.01); *F24H 15/407* (2022.01); *H05B 2203/021* (2013.01)

(58) Field of Classification Search

CPC ........ F24H 1/102; F24H 1/103; F24H 9/2028; H05B 1/00

USPC .................. 392/465, 484, 490; 219/490–494

See application file for complete search history.

(56) References Cited

U.S. PATENT DOCUMENTS

| | | | | |
|---|---|---|---|---|
| 4,638,147 A * | 1/1987 | Dytch | .................. | F24H 9/2028 219/486 |
| 4,808,793 A | 2/1989 | Hurko | | |

(Continued)

*Primary Examiner* — Nathaniel E Wiehe
*Assistant Examiner* — Thomas J Ward
(74) *Attorney, Agent, or Firm* — Honigman LLP; Eric J. Sosenko; Jonathan P. O'Brien

(57) ABSTRACT

A method of operating a tankless water heater for heating a continuous supply of water. The method includes detecting a water flow condition within a heating chamber of the tankless water heater and regulating electrical current to first and second heating elements in response thereto. Both the first and second heating elements are located in the heating chamber, and respectively have first and second wattages, where second wattage is different than the first wattage. The regulating step further includes providing electrical current to the first heating element and not to the second heating element when a first flow condition is detected, and providing electrical current to the second heating element and not the first heating element when a second flow condition is detected, and providing electrical current to both of the heating elements when a third flow condition is detected.

16 Claims, 4 Drawing Sheets

(51) Int. Cl.

| | |
|---|---|
| ***H05B 3/00*** | (2006.01) |
| ***H05B 3/42*** | (2006.01) |
| ***H05B 3/82*** | (2006.01) |

(56) References Cited

U.S. PATENT DOCUMENTS

| | | | | |
|---|---|---|---|---|
| 5,216,743 | A * | 6/1993 | Seitz | F24H 9/2014<br>73/204.16 |
| 5,408,578 | A | 4/1995 | Bolivar | |
| 6,389,226 | B1 | 5/2002 | Neale et al. | |
| 6,649,881 | B2 | 11/2003 | Scott et al. | |
| 8,104,434 | B2 | 1/2012 | Fabrizio | |
| 8,150,246 | B1 | 4/2012 | Bolivar | |
| 2006/0027673 | A1* | 2/2006 | Fabrizio | F24H 15/219<br>237/2 A |
| 2012/0057857 | A1 | 3/2012 | Kenney et al. | |
| 2015/0184890 | A1* | 7/2015 | Stebbins | F24H 15/45<br>219/486 |

* cited by examiner

DUAL ELEMENT ELECTRIC TANKLESS WATER HEATER

CROSS-REFERENCE TO RELATED APPLICATIONS

This application is a divisional of U.S. patent application Ser. No. 15/377,185, filed on Dec. 13, 2016, the entire contents of which are hereby incorporated by reference.

BACKGROUND

1. Field of the Invention

The present disclosure generally relates to a dual element electric tankless water heater. More specifically, the present disclosure relates to a dual element electric tankless water heater system and method for controlling such a system.

2. Related Technology

Tankless water heaters are often used to increase the temperature of water supplied from a water source. Such water heaters often include an inlet, an outlet, a conduit for transporting the water from the inlet to the outlet, and one or more heater elements for increasing the temperature of the water prior to the water exiting the outlet.

In order to achieve a desired temperature of water exiting the outlet of the tankless water heater, it is often necessary to control the electrical energy supplied to one or more heater elements. The heating element(s) must be of sufficient wattage to maintain the desired outlet water temperature at the maximum flow rate of the tankless water heater.

However, because of the high wattage of the heating element(s), supplying hot water of the required temperature at very low flow rates is not possible without risk of overheating. For this reason, the heating element(s) is not activated until a minimum flow rate, one at which overheating will not occur, is detected. Very low flow rates are therefore not heated.

While existing electric tankless water heaters have proven acceptable for their intended purpose, a continuous need for improvement remains in the relevant art.

SUMMARY

In satisfying the above need, as well as overcoming the various drawbacks and other limitations of the related art, the present disclosure presents an electric tankless water heater with two heating elements. The two heating elements may be of different or the same wattages, housed in one heating chamber, and acting as primary and secondary heating elements. By staging and separating the activation of the heating elements, low flow activation (e.g., 0.2 gallons per minute (GPM)) can be achieved without overheating the water heater unit. The primary (e.g., lower wattage) heating element may be activated upon detection of a low flow condition. As the flow increases, the secondary (e.g., higher wattage) heating element can be operated either solely or in conjunction with the lower wattage heating element to achieve a hot water output commensurate with the flow rate.

One aspect of the disclosure provides a tankless water heater for heating a continuous supply of water. The tankless water heater includes a heater assembly, a temperature sensor, a flow sensor, a first heating element, a second heating element, and a controller. The heater assembly includes a water inlet, a water outlet and a heating chamber which defines at least part of a water flow path between the water inlet and the water outlet. The temperature sensor may be configured to measure the temperature of water flowing through the heating chamber of the heater assembly. The flow sensor may be configured to measure a flow condition of water within the heating chamber of the heater assembly. The first heating element is located in heating chamber and may include a first wattage. The second heating element is also be located in the heating chamber and may include a second wattage that is different from or the same as the first wattage. The controller is coupled to the first and second heating elements, the temperature sensor, and the flow sensor. The controller may be configured to regulate the amount of electrical current flowing through the first and second heating elements in response to the flow condition measured by the flow sensor.

Implementations of the disclosure may include one or more of the following optional features. The controller may be configured to regulate the amount of electrical current flowing through the first and second heating elements in a staged and separate activation sequence. In some implementations, upon the flow sensor measuring a low flow condition, the controller is configured to provide electrical current to the first heating element while not providing electrical current to the second heating element. The low flow condition may include a flow rate of water through the heater assembly that is greater than 0 gallons per minute and less than 0.4 gallons per minute.

In some implementations, the controller is configured to provide electrical current to the second heating element while not providing electrical current to the first heating element upon the flow sensor measuring an intermediate flow condition. The intermediate flow condition may be greater than the low flow condition. The intermediate flow condition may include a flow rate of water through the heater assembly that is greater than 0.4 gallons per minute and less than 1.0 gallons per minute.

The controller may be configured to provide electrical current to the first heating element and to the second heating element upon the flow sensor measuring a high flow condition. The high flow condition may include a flow rate of water through the heater assembly that is greater than 1.0 gallons per minute.

In some implementations, the heating assembly includes a single heating chamber. The heating chamber may define a substantially constant diameter over its length. In some implementations, the heating chamber defines a reverse bend or serpentine flow path. In some implementations, the heating chamber defines a serpentine flow path of constant diameter over its length.

In some implementations, the first heating element is sheathless. In some implementations, the second heating element is sheathless.

In some implementations, the first heater element is coupled to the controller at a first pole and at a second pole. The second heater element may be coupled to the controller at a third pole and at a fourth pole. The second pole and the fourth pole may include, and/or otherwise define, a common pole to both the first and the second heater elements.

Another aspect of the disclosure provides a method of operating a tankless water heater for heating a continuous supply of water. The method includes detecting a flow condition of water within a heating chamber of a heater assembly of the tankless water heater. The method may also include regulating electrical current to a first heating element and a second heating element in response to the detected flow condition. The first and second heating elements are located in the heating chamber, and the first heating element may include a first wattage while the second heating element may include a second wattage. In a preferred implementation, the second wattage is different than the first wattage. The regulating step may further include providing electrical current to the first heating element and not to the second heating element when a first flow condition is detected. The regulating step may also include providing electrical current to the second heating element and not the first heating element when a second flow condition is detected. The regulating step may still further include providing electrical current to both of the first and second heating elements when a third flow condition is detected.

In some implementations, during the detecting step, the first flow condition is detected at a flow rate of greater than 0 gallons per minute and less than 0.4 gallons per minute. During the detecting step, the second flow condition may be detected at a flow rate of greater than 0.4 gallons per minute and less than 1.0 gallons per minute. In some implementations, during the detecting step, the third flow condition is detected at a flow rate of greater than 1.0 gallons per minute. The regulating step may regulate the electrical current provided to the first and second heating elements to provide water at an outlet of the tankless water heater at a common predetermined temperature during detection of any of the first, second, and third flow conditions.

Further objects, features and advantages will become readily apparent to persons skilled in the art after review of the following description with reference to the drawings and the claims that are appended to inform a part of this specification.

BRIEF DESCRIPTION OF THE DRAWINGS

The drawings described herein are for illustrative purposes only of selected configurations and not all possible implementations, and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Figure 1:
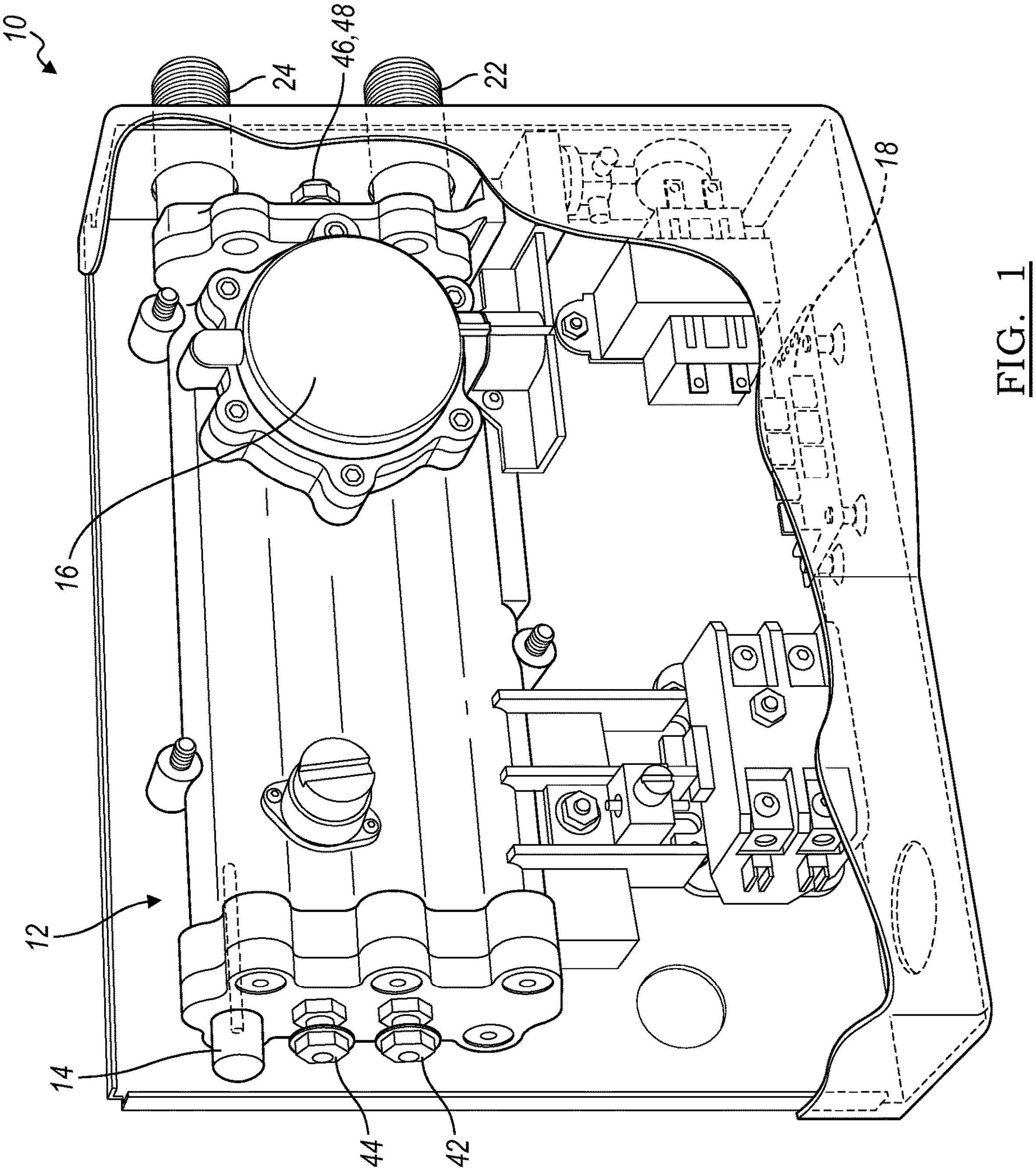
FIG. 1 is a perspective view, with portions broken away, of an electric tankless water heater incorporating the principles of the present disclosure.

Referring now to the drawings, a tankless water heater embodying the principles of the present disclosure is generally illustrated in FIG. 1 and designated at 10. In this regard, while the tankless water heater 10 is generally shown and described herein as being a heater for a continuous water supply, it will be appreciated that the tankless water heater 10 may be used for heating a continuous or intermittent supply of other fluid(s) within the scope of the present disclosure.

Figure 2:
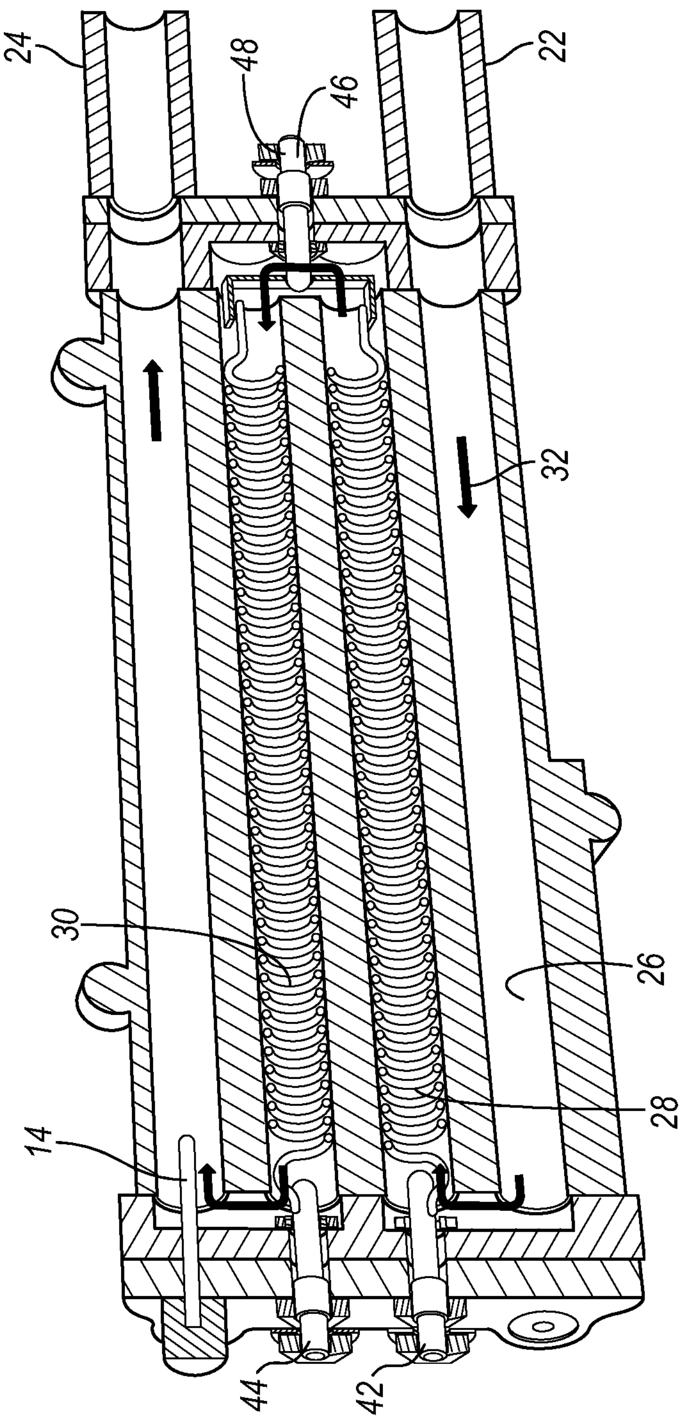
FIG. 2 is a cross-sectional view of a subcomponent, namely an electric heater element assembly, of the tankless water heater seen in FIG. 1.

As illustrated in FIGS. 1, 2, and/or 3, the tankless water heater 10 includes as its principal components a heater assembly or housing 12, a temperature sensor 14, a flow sensor 16, a controller 18, and a power system 20. The heater assembly 12 further include a fluid inlet 22, a fluid outlet 24, a heating chamber 26, a first heating element 28, and a second heating element 30. The heating chamber 26 defines at least part of a water flow path 32 between the fluid inlet 22 and the fluid outlet 24. As illustrated in FIG. 2, the flow path 32 defines a reverse bend or serpentine shape, and the heating chamber 26 defines a single heating chamber having a reverse bend or serpentine shape extending along its length from the fluid inlet 22 to the fluid outlet 24. While illustrated as having a reverse bend or serpentine shape, the heating chamber 26 may have alternate shapes and configurations depending on the particular application, as well as the overall size and shape of the heater assembly 12. The heating chamber 26 may further define a circular cross-sectional shape along its length from the fluid inlet 22 to the fluid outlet 24. In this regard, the heating chamber 26 may define a constant diameter along the flowpath 32.

The first heating element 28 is disposed in the heating chamber 26 and may operate up to, and at, a first wattage. The first wattage may be between 720 Watts and 8550 Watts. In some implementations, the first wattage may be substantially equal to 720 Watts. The second heating element 30 is also disposed in the heating chamber 26 and may operate up to and including a second wattage. The second wattage may be between 720 Watts and 8550 Watts. In some implementations, the second wattage may be substantially equal to 8550 Watts. In this regard, the second wattage is different than the first wattage.

At least one of the first and second heating elements 28, 30 may be formed of a resistive heating material. In this regard, the first and/or second heating elements 28, 30 may be formed from an electrically conductive material, such as a metallic material (e.g., molybdenum, tungsten, tantalum, niobium, and alloys thereof), for example, through which electricity may flow and provide resistive heat to the heater assembly 12.

In some implementations, one or both of the first and second heating elements 28, 30 may be sheathless. In this regard, the first and/or second heating elements 28, 30 may not include a ceramic coating covered by a stainless steel sheath or other coating or cover material, such that the first and/or second heating elements 28, 30, including the resistive heating material forming at least a part thereof, are directly disposed within the heating chamber 26 and in contact with the fluid flowing through the heating chamber 26.

With reference to FIG. 2, the temperature sensor 14 measures the temperature of the fluid flowing through the heating chamber 26 of the heater assembly 12, and is in communication with the controller 18. In this regard, the temperature sensor 14 is preferably coupled to the heater assembly 12 downstream of the heating elements 28, 30 or proximate the fluid outlet 24 to measure the temperature of the fluid as it is about to exit the water heater 10. As will be explained in more detail below, the temperature sensor 14 communicates the temperature of the fluid to the controller 18.

The flow sensor 16 measures a flow condition of fluid along the flowpath 32 and within the heating chamber 26 of the heater assembly 12, and is also in communication with the controller 18. The flow sensor 16 may be coupled to the heater assembly 12 along the flowpath 32 or more particularly, as shown, proximate the fluid inlet 22 to measure the flow condition of the fluid flowing along the flowpath 32 proximate the fluid inlet 22. As will be explained in more detail below, the flow sensor 16 communicates the flow condition to the controller 18. As used herein, the flow condition is the flow rate (e.g., gallons per minute) of the fluid flowing along the flowpath 32, but may optionally include other parameters of the fluid flow.

The controller 18 is coupled to, or otherwise in communication with, the first heating element 28, the second heating element 30, the temperature sensor 14, and the flow sensor 16. In this regard, the controller 18 uses signals received from the temperature sensor 14 and/or the flow sensor 16 to control the operation of the tankless water heater 10. For example, during operation of the tankless water heater 10, and in response to signals received from the temperature sensor 14 and/or the flow sensor 16, the controller 18 may regulate the amount of electrical current flowing through the first heating element 28 and the second heating element 30.

In some implementations, the controller 18 regulates the amount of electrical current flowing through the first and second heating elements 28, 30 in a staged and separate activation sequence. For example, the controller 18 may separate the activation sequence of the first and second heating elements 28, 30 by providing electrical current to the first heating element 28 while not providing electrical current to the second heating element 30. In particular, the controller 18 may provide electrical current in this manner upon the flow sensor 16 measuring a low flow condition. For example, upon the flow sensor 16 measuring a low flow rate of water through the heater assembly 12 (e.g., along the flowpath 32), one that is greater than 0 gallons per minute but less than 0.4 gallons per minute, the controller 18 may provide electrical current to the first heating element 28 while not providing electrical current to the second heating element 30. Preferably, the controller 18 will provide electrical current to the first heating element 28 and not the second heating element 30 upon the flow sensor 16 detecting a flow rate of water along the flowpath 32 that is equal to or greater than 0.2 gallons per minute and less than 0.4 gallons per minute.

Upon the flow sensor 16 measuring an intermediate flow condition the controller 18 provides electrical current to the second heating element 30, while not providing electrical current to the first heating element 28. For example, when the flow sensor 16 measures a flow rate that is greater than the low flow condition, the controller 18 may provide electrical current to the second heating element 30 while not providing electrical current to the first heating element 28. In particular, upon the flow sensor 16 measuring a flow rate that is equal to or greater than 0.4 gallons per minute and less than 1.0 gallons per minute, the controller 18 may provide electrical current to the second heating element 30 while not providing electrical current to the first heating element 28.

Additionally, the controller 18 may provide electrical current to both the first heating element 28 and the second heating element 30 upon the flow sensor 16 measuring a high flow condition, for example, upon measuring a flow rate of water that is equal to or greater than 1.0 gallons per minute.

Figure 3:
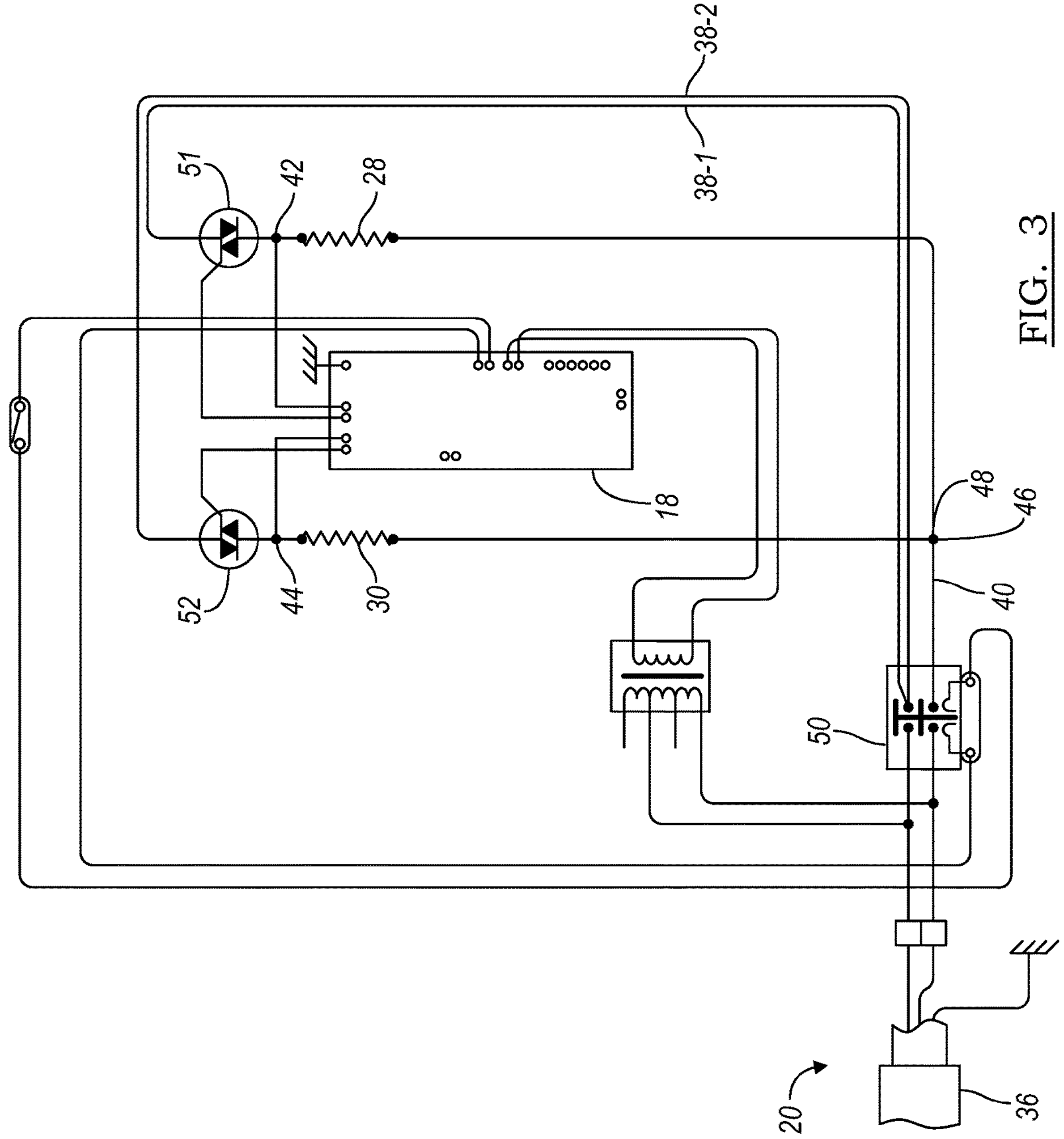
FIG. 3 is schematic electrical diagram of the main electrical connections for an electric tankless water heater incorporating the principles of the present disclosure.

With reference to FIGS. 2 and 3, the power system 20 may include a power source 36, a first line conductor 38-1, a second line conductor 38-2, a load conductor 40, a first pole 42, a second pole 44, a third pole 46, a fourth pole 48, and a switch 50. The power source 36 may be provided as an alternating current source, such as a 110 v (or up to 600 v) outlet or a generator, for example or a direct current source, such as a battery, for example. The first line conductor 38-1 is coupled to, and receives electrical power from, the power source 36 and transmits the electrical power through triac 51 to the first pole 42. The second line conductor 38-2 is coupled to, and receives electrical power from, the power source 36 and transmits the electrical power through triac 52 to the second pole 44. The load conductor 40 may transmit electrical power away from the third pole 46 and the fourth pole 48. In a preferred construction, the third pole 46 is the same as the fourth pole 48 and the third and fourth poles 46, 48 may be collectively referred to herein as a common pole. In this regard, the load conductor 40 is coupled to, and transmit power away from, the common pole.

As seen in FIG. 3, the first heater element 28 is coupled to the first pole 42 and the third pole 46. In this regard, the first heater element 28 is also coupled to the controller 18 at the first pole 42, such that electrical power can be selectively transmitted by the controller 18, through operation of triac 51 from the first line conductor 38-1 to the first pole 42, and from the first pole 42 to the first heater element 28. The second heater element 30 is coupled to the second pole 44 and the fourth pole 48. In this regard, the second heater element 30 is coupled to the controller 18 at the second pole 44, such that electrical power can be selectively transmitted by the controller 18 via the triac 52 from the second line conductor 38-2 to the second pole 44, and from the second pole 44 to the second heater element 30. As described above, in the preferred implementations, the third pole 46 and the fourth pole 48 collectively define the common pole, such that the first heater element 28 and the second heater element 30 are coupled to the common pole. With this electrical layout, the controller 18 can energize the first and second heater elements 28, 30 through separate activation, where only an individual heating element is activated, in a staged activation, where the heating elements 28, 30 are successive energized, or collective activation, where both heater elements 28, 30 are energized.

Figure 4:
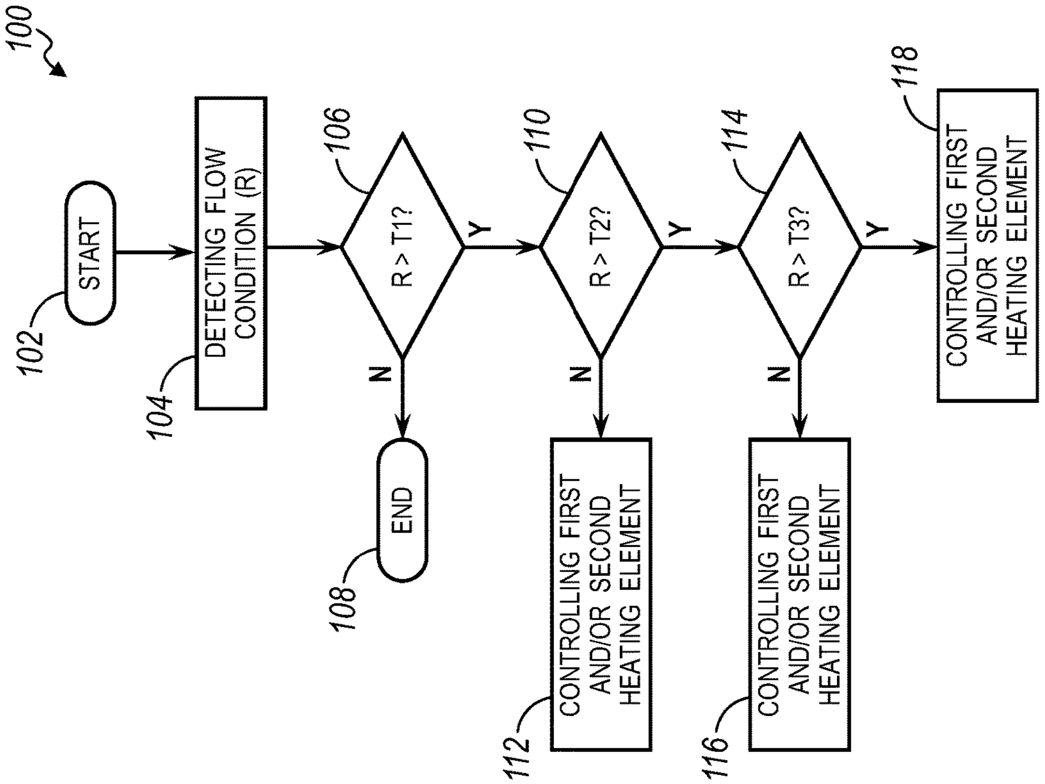
FIG. 4 is flowchart illustrating an example method of operating an electric tankless water heater according to the principles of the present disclosure.

With reference to FIG. 4, a method 100 of operating a tankless water heater (e.g., tankless water heater 10) to heat a continuous supply of water begins at step 102. At step 104, the method detects a flow condition R of water within the heating chamber 26 of the heater assembly 12 of the tankless water heater 10. Preferably, the flow condition R includes the flow rate (e.g., gallons per minute) of water through the heating chamber 26.

At step 106, the method determines whether the flow condition R is greater than a first threshold flow condition T1. For example, at step 106, the method may determine whether the flow rate of water through the heating chamber 26 is greater than zero gallons per minute and also equal to or greater than 0.2 gallons per minute. In this regard, if the first threshold flow condition is met, the flow at least corresponds to a low flow rate condition. If step 106 is false (threshold flow condition T1 is not met), the method ends at step 108. If step 106 is true (threshold flow condition T1 is met), the method proceeds to step 110.

At step 110, the method determines whether the flow condition R is greater than a second threshold flow condition T2. For example, at step 110, the method determines whether the flow rate of water through the heating chamber 26 is equal to or greater than 0.4 gallons per minute. In this regard, if the second threshold flow condition is met, the flow may correspond to an intermediate flow rate condition.

If step 110 is false (threshold flow condition T2 is not met), the flow corresponds to a low flow rate condition and the method proceeds to step 112, where the method includes controlling the first heating element 28 in response to the detected flow condition R. For example, at step 112, the method includes providing electrical current to the first heating element 28 and not providing electrical current to the second heating element 30. In this regard, at step 112, the method includes regulating the electrical current provided to the first and second heating elements 28, 30 to provide water at the outlet 24 of the tankless water heater 10 at a predetermined temperature when the detected flow condition R is greater than the first threshold flow condition T1 and less than or equal to the second threshold flow condition T2.

If step 110 is true (threshold flow condition T2 is met), the method proceeds to step 114. At step 114, the method determines whether the flow condition R is greater than a third threshold flow condition T3. For example, at step 114, the method may determine whether the flow rate of water through the heating chamber 26 is equal to and greater than 1.0 gallons per minute. In this regard, if the third threshold flow condition is met, the flow corresponds to a high flow rate condition.

If step 114 is false (threshold flow condition T3 is not met), the method proceeds to step 116, where the method further regulates electrical current to the first heating element 28 and the second heating element 30 in response to the detected flow condition R. At step 116, the method provides electrical current to the second heating element 30 and does not providing electrical current to the first heating element 28. Alternatively, at step 116, the method may provide electrical current to the first heating element 28 in response to the flow condition R, whereas at step 112, the method provides electrical current to the second heating element 30 in response to the flow condition R. Thus, at step 116, the method regulates the electrical current provided to the first and second heating elements 28, 30 to provide water at the outlet 24 of the tankless water heater 10 at the common predetermined temperature when the detected flow condition R is greater than the second threshold flow condition T2 and less than or equal to the third threshold flow condition T3.

If step 114 is true (threshold flow condition T3 is met), the method proceeds to step 118, where the method regulates electrical current to the first and second heating elements 28, 30 in response to the detected flow condition R. For example, at step 118, the method includes providing electrical current to both the first heating element 28 and to the second heating element 30. In this regard, at step 118, the method includes regulating the electrical current provided to the first and second heating elements 28, 30 to provide water at the outlet 24 of the tankless water heater 10 at the common predetermined temperature when the detected flow condition R is greater than the third threshold flow condition T3.

As a person skilled in the art will really appreciate, the above description is meant as an illustration of at least one implementation of the principles of the present invention. This description is not intended to limit the scope or application of this invention since the invention is susceptible to modification, variation and change without departing from the spirit of this invention, as defined in the following claims.

I claim:

1. A method of operating a tankless water heater for heating a continuous supply of water, the method comprising the steps of:

detecting a flow condition of water within a heating chamber of a heater assembly of the tankless water heater;

regulating electrical current to a first heating element and a second heating element in response to the detected flow condition, both the first and second heating elements being located in the heating chamber, the first heating element having a first wattage and the second heating element having a second wattage, the second wattage being different than the first wattage;

detecting a first flow condition and providing electrical current to the first heating element and providing no electrical current to the second heating element at any time during detection of the first flow condition;

detecting a second flow condition and providing electrical current to the second heating element and providing no electrical current to the first heating element during the entire time the second flow condition is detected; and detecting a third flow condition and continuously providing electrical current to the first heating element during the entire time the third flow condition is detected and continuously providing electrical current to the second heating element during the entire time the third flow condition is detected.

2. The method according to claim 1, wherein during the detecting step, the first flow condition is detected at a flow rate of greater than 0.2 gallons per minute and less than 0.4 gallons per minute.

3. The method according to claim 2, wherein during the detecting step, the second flow condition is detected of a flow rate of greater than 0.4 gallons per minute and less than 1.0 gallons per minute.

4. The method according to claim 3, wherein during the detecting step, the third flow is detected at a flow rate of greater than 1.0 gallons per minute.

5. The method according to claim 4, wherein the regulating step regulates the electrical current provided to the first and second heating elements to provide water at an outlet of the tankless water heater at a common predetermined temperature during detection of any of the first, second and third flow conditions.

6. The method according to claim 1, wherein during the detecting step, the second flow condition is detected of a flow rate of greater than 0.4 gallons per minute and less than 1.0 gallons per minute.

7. The method according to claim 1, wherein during the detecting step, the third flow is detected at a flow rate of greater than 1.0 gallons per minute.

8. The method according to claim 1, wherein the regulating step regulates the electrical current provided to the first and second heating elements to provide water at an outlet of the tankless water heater at a common predetermined temperature during detection of any of the first, second and third flow conditions.

9. The method according to claim 1, wherein the first heating element and the second heating element are located in series in the heating chamber.

10. The method according to claim 1, wherein the second heating element is located downstream of the first heating element.

11. The method according to claim 1, wherein the first heating element is axially oriented with respect to flow of water through the heating chamber.

12. The method according to claim 11, wherein the second heating element is axially oriented with respect to flow of water through the heating chamber.

13. The method according to claim 1, wherein the second heating element is axially oriented with respect to flow of water through the heating chamber.

14. The method according to claim 1, further comprising the step of not energizing the first heating element when neither of the first, second and third flow conditions are detected.

15. The method according to claim 14, further comprising the step of not energizing the second heating element when neither of the first, second and third flow conditions are detected.

16. The method according to claim 1, further comprising the step of not energizing either of the first heating element and the second heating element when neither of the first, second and third flow conditions are detected.

* * * * *